(12) United States Patent
Abe et al.

(10) Patent No.: US 6,329,611 B1
(45) Date of Patent: Dec. 11, 2001

(54) APPARATUS FOR MEASURING WEIGHT AND FORCE WITH MAGNETIC FLUID SEAL

(75) Inventors: Tetsuya Abe, Ibaraki; Kozo Terunuma, Tokyo, both of (JP)

(73) Assignees: Japan Atomic Energy Research Institute; Shinko Denshi Company Limited, both of Tokyo (JP)

( * ) Notice: Subject to any disclaimer, the term of this patent is extended or adjusted under 35 U.S.C. 154(b) by 0 days.

(21) Appl. No.: 09/506,331

(22) Filed: Feb. 18, 2000

(30) Foreign Application Priority Data

Feb. 22, 1999 (JP) ................................................. 11-042707

(51) Int. Cl.[7] ............................. G01L 1/10; G01G 23/02; G01G 21/28
(52) U.S. Cl. ......................... 177/124; 177/238; 177/243; 73/862.381; 73/862.621
(58) Field of Search .................................. 177/229, 238, 177/239, 243, 124; 73/862.381, 862.541, 862.621

(56) References Cited

U.S. PATENT DOCUMENTS

| | | | | |
|---|---|---|---|---|
| 3,444,943 | * | 5/1969 | Tytus | 177/238 |
| 4,072,049 | * | 2/1978 | Miller | 73/147 |
| 4,320,809 | * | 3/1982 | Knothe et al. | 177/243 |
| 4,884,645 | * | 12/1989 | Knothe et al. | 177/243 |
| 5,052,505 | * | 10/1991 | Naito et al. | 177/229 |
| 5,587,698 | * | 12/1996 | Genna | 73/146.5 |
| 5,895,894 | * | 4/1999 | Zumbach | 177/229 |
| 6,166,336 | * | 12/2000 | Odiet | 177/229 |

* cited by examiner

Primary Examiner—Randy W. Gibson
(74) Attorney, Agent, or Firm—Vardnell & Varndell, PLLC

(57) ABSTRACT

An apparatus for measuring weight of a substance placed within a substrate space which is subjected to sever conditions, including a measuring unit having a transducer and placed within a measuring space, a partition member provided between the measuring space and the substance space and having hole through which said measuring space is communicated with said substance space, a rod-like member extending through said hole formed in the partition member such that a first end of said force transferring member situates within said substance space and a second end of said force transferring member situates within said measuring space, a parallel link mechanism arranged within the measuring space and connected with the rod-like member, a magnetic fluid provided in a space within said hole such that said substance space and measuring space is isolated from each other in a liquid tight manner by means of said magnetic fluid, and a magnetic force generating unit producing a magnetic force such that said magnetic fluid is kept in position by said magnetic force.

8 Claims, 1 Drawing Sheet

APPARATUS FOR MEASURING WEIGHT AND FORCE WITH MAGNETIC FLUID SEAL

BACKGROUND OF THE INVENTION

1. Field of the Invention

The present invention relates to an apparatus for measuring a weight and/or a force caused by a substance which is subjected to severe circumstances.

2. Related Art Statement

Upon measuring a weight of a substance, an electronic weighing apparatus has been widely used. In general, a substance whose weight is to be measured is placed in a same environment as that in which an electronic weighing apparatus is installed. However, in some cases, substances are placed in severe environments such as poisonous gas atmospheres and corrosive gas atmosphere. In such a case, when the electronic weighing apparatus is installed in the same environment as that in which the substance whose weight is to be measured, the weighing apparatus and a measuring sensor are also subjected to the severe environment and are liable to be damaged. When the electronic weighing apparatus is kept in such a severe environment for a long time, the apparatus might be corroded or broken and the accurate measurement could not be carried out any more.

In order to mitigate the above mentioned problem, there has been proposed a known weight/force measuring apparatus, in which a part of an electronic weighing apparatus is placed in a substance space in which a substance is existent, and the remaining parts of the weighing apparatus are installed in a measuring space which is completely separated from the substance space. For instance, a permanent magnet is coupled with a member which is moved up and down in response to a weight of a substance and is placed in the substrate space, and a position sensor which detects a position of the permanent magnet and an electromagnetic coil within which said permanent magnet is inserted are installed within the measuring space which is separated from the substance space by means of a partition wall. In such a weight measuring apparatus, a position of the permanent magnet is detected by the position sensor and an electric current passing through the electromagnetic coil is controlled in accordance with an output signal of the position sensor such that the permanent magnet is always positioned at a predetermined position with respect to the electromagnetic coil. In this manner, a weight of the substance can be measured by monitoring the electric current passing through the electromagnetic coil.

In this known weight measuring apparatus, since almost all parts except for the permanent magnet is arranged within the safe measuring space, even if the substance space is subjected to severe conditions, the measuring could be performed. However, the permanent magnet is not directly coupled with the electromagnetic coil, but is separated from the main parts of the measuring apparatus, and therefore an accurate measurement could not be attained.

SUMMARY OF THE INVENTION

The present invention has for its object to provide a novel and useful apparatus for measuring weight/force of a substance in an accurate manner without being influenced by a severe environment within which the substrate is placed.

According to the invention, an apparatus for measuring weight/force of a substance comprises:

a measuring unit having a transducer;

a partition member provided between a measuring space in which said measuring unit is arranged and a substance space in which the substance whose weight/force is to be measured is placed, said partition member having a hole formed therein, said measuring space being communicated with said substance space through said hole;

a force transferring member extending through said hole formed in the partition member such that a first end of said force transferring member situates within said substance space and a second end of said force transferring member situates within said measuring space and is connected to said transducer;

a magnetic fluid provided in a space within said hole such that said substance space and measuring space is isolated from each other in a liquid tight manner by means of said magnetic fluid; and a magnetic force generating means for producing a magnetic force such that said magnetic fluid is kept in position by said magnetic force.

In a preferable embodiment of the weight/force measuring apparatus according to the invention, said partition member is arranged horizontally, said substance space and measuring space are separated vertically by means of the horizontally arranged partition member, and said force transferring member is arranged vertically. In this case, although either one of the substance space and measuring space may be arranged above the other, it is preferable to arrange the measuring space above the substance space.

In a preferable embodiment of the weight/force measuring apparatus according to the invention, said magnetic force generating means includes a ring shaped permanent magnet, a ring shaped magnetic yoke arranged to surround the permanent magnet except for an inner side of the permanent magnet, and a nonmagnetic ring provided on the inner side of the permanent magnet, said permanent magnet, magnetic yoke and nonmagnetic ring being arranged concentrically to surround the hole formed in the partition member. In this case, the ring shaped permanent magnet is magnetized in an axial direction, i.e. a central axial direction of the hole.

DESCRIPTION OF THE PREFERRED EMBODIMENTS

Figure 1:
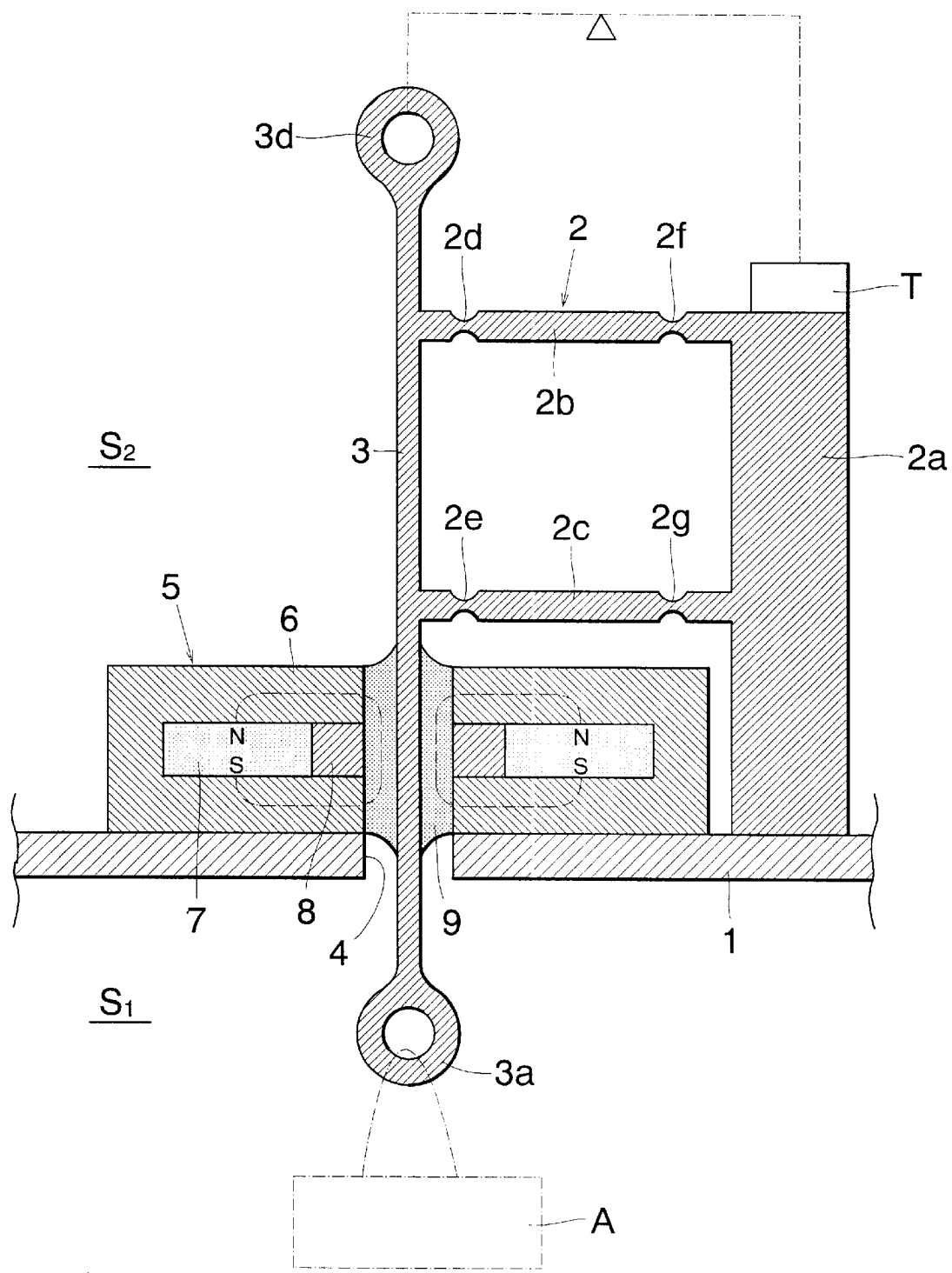
FIG. 1 is a perspective view showing an embodiment of the weight/force measuring apparatus according to the invention.

Now the present invention will be explained in detail with reference to a sole accompanying drawing.

In the present embodiment, the partition member is formed by a supporting plate 1 which is arranged horizontally. Below the supporting plate 1 there is formed a substance space $S_1$ and above the supporting plate there is formed a measuring space $S_2$. On the supporting plate 1 is secured a base portion 2a of a Roberval parallel link mechanism 2, and a rod-like member 3 is secured to a pair of parallel arms 2b and 2c by means of flexures 2d and 2e, respectively, said parallel arms being secured to the base portion 2a by means of flexures 2f and 2g, respectively. In the present embodiment, the Roberval parallel link mechanism 2 and rod-like member 3 are formed cutting a single sheet made of nonmagnetic stainless steel. According to the invention, the rod-like member 3 may be formed separately from the link mechanism 2. In this case, it is sufficient to make only the rod-like member 3 of a nonmagnetic material such as stainless steel, copper and phosphor bronze. A lower portion of the rod-like member 3 protrudes downward through a hole 4 formed in the supporting plate 1, and a substance A whose weight is to be measured is hung from a lower end 3a of the rod-like member 3 as shown by an imaginary line. An upper end 3b of the rod-like member 3 is coupled with a transducer T of the weight/force measuring unit also shown by an imaginary line.

According to the invention, a force applied to the lower end 3a of the rod-like member 3 is directly transferred through the hole 4 formed in the supporting plate 1 to the upper end 3b of the rod-like member 3. In order not to communicate the substance space $S_1$ and measuring space $S_2$ with each other through the hole 4, a magnetic force generating unit 5 is provided on the upper surface of the supporting plate 1 such that the hole 4 is surrounded by the magnetic force generating unit 5. The magnetic force generating unit 5 comprises a ring-shaped permanent magnet 7, a ring-shaped yoke member 6 embracing the permanent magnet 7 except for an inner side of the permanent magnet 7, and a nonmagnetic ring 8 provided on the inner side of the permanent magnet 7. The permanent magnet 7, yoke member and nonmagnetic ring 8 are all arranged concentrically with respect to a central axis of the hole 4. The permanent magnet 7 is magnetized in the vertical direction, i.e. a direction of the central axis of the hole 4. Within a cylindrical space of the magnetic force generating unit 5, is provided a magnetic fluid 9. Then, the magnetic force generating unit 5 produces a magnetic flux passing through the magnetic fluid 9, and the magnetic fluid 9 is retained within the inner space of the magnetic force generating unit 5 such that a space within the hole 4 is closed by the magnetic fluid 9 in a liquid tight manner.

As explained above, according to the invention, the rod-like member 3 serving to transfer the force applied to the lower end 3a of the rod-like member 3 to the upper end 3b coupled with the transducer T extends from the substance space $S_1$ to the measuring space $S_2$ through the hole 4 formed in the supporting plate 1 which separates these spaces $S_1$ and $S_1$ from each other. Since the space within the hole 4 is filled with the magnetic fluid 9 in the liquid tight manner, the measuring unit provided in the measuring space $S_2$ is completely free from the severe environment within the substance space $S_1$. In this manner, the measuring unit can be effectively protected from the attaching environment in the substance space $S_1$, and at the same time, the force applied to the lower end 3a of the rod-like member 3 is directly transferred the upper end 3b of the rod-like member 3. Therefore, the weight of the substance or force produced by the substance within the substance space $S_1$ can be measured precisely. Furthermore, the measuring unit is not attached by the severe environment within the substance space $S_1$ and can be used for a long time.

In the weight/force measuring apparatus according to the invention, the displacement/force transferring rod-like member 3 is brought into contact with the magnetic fluid 9, and thus the measuring precision is influenced by a surface tension of the magnetic fluid 9. However, this influence is not so large and can be sufficiently decreased by suitably setting various conditions of the magnetic fluid 9 as well as the magnetic force generating unit 5.

The present invention is not limited only to the above explained embodiment, but many alternations and modifications may be conceived by a person skilled in the art within the scope of the invention. For instance, in the above embodiment, the substance space $S_1$ and measuring space $S_2$ are arranged below and above the supporting plate 1, respectively, but these spaces may be inverted.

Furthermore, in the above embodiment, the supporting plate 1 serving as the partition member is arranged horizontally, but according to the invention the partition member may be arranged in any posture. For instance, the partition member may be arranged vertically. Moreover, in the above embodiment, the displacement/force transferring member is formed by the rod-like member 3, but according to the invention, the displacement/force transferring member may be formed by a wire or strand.

As explained above, in the weight/force measuring apparatus according to the invention, a weight of a substance provided within the substance space or a force produced within the substance space filled with a severe atmosphere can be directly measured by the measuring unit arranged within the measuring space which is completely separated from the substance space by means of the magnetic fluid.

What is claimed is:

1. An apparatus for measuring weight/force of a substance comprising:
    a measuring unit having a transducer;
    a partition member provided between a measuring space in which said measuring unit is arranged and a substance space in which the substance whose weight/force is to be measured is placed, said partition member having a hole formed therein, said measuring space being communicated with said substance space through said hole;
    a force transferring member extending through said hole formed in the partition member such that a first end of said force transferring member situates within said substance space and a second end of said force transferring member situates within said measuring space and is coupled with said transducer;
    a magnetic fluid provided in a space within said hole such that said substance space and measuring space is isolated from each other in a liquid tight manner by means of said magnetic fluid; and
    a magnetic force generating means for producing a magnetic force such that said magnetic fluid is kept in position by said magnetic force.

2. An apparatus according to claim 1, wherein said partition member is arranged horizontally, said substance space and measuring space are separated vertically by means of the horizontally arranged partition member, and said force transferring member is arranged vertically.

3. An apparatus according to claim 2, wherein said force transferring member is a rod.

4. An apparatus according to claim 3, wherein said rod is supported within said measuring space by a parallel link mechanism such that the rod can be resiliently moved in the vertical direction.

5. An apparatus according to claim 4, wherein said rod and parallel link mechanism are formed as an integral single body.

6. An apparatus according to claim 5, wherein said rod and parallel link mechanism are formed by cutting a stainless steel plate.

7. An apparatus according to claim 1, wherein said magnetic force generating means includes a ring shaped permanent magnet, a ring shaped magnetic yoke arranged to surround the permanent magnet except for an inner side of the permanent magnet, and a nonmagnetic ring provided on the inner side of the permanent magnet, said permanent magnet, magnetic yoke and nonmagnetic ring being arranged concentrically to surround the hole formed in the partition member, and the ring shaped permanent magnet is magnetized in an axial direction.

8. An apparatus according to claim 7, wherein said force transferring member is made of a nonmagnetic material.

* * * * *